(12) United States Patent
Brown

(10) Patent No.: US 7,240,547 B2
(45) Date of Patent: *Jul. 10, 2007

(54) METHOD AND APPARATUS FOR MEASURING FLUID PROPERTIES

(75) Inventor: George A. Brown, Beaconsfield (GB)

(73) Assignee: Schlumberger Technology Corp., Sugar Land, TX (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/160,931

(22) Filed: Jul. 15, 2005

(65) Prior Publication Data
US 2006/0010973 A1    Jan. 19, 2006

(51) Int. Cl.
*G01F 1/68* (2006.01)
(52) U.S. Cl. .................................... 73/204.11
(58) Field of Classification Search ............. None
See application file for complete search history.

(56) References Cited

U.S. PATENT DOCUMENTS

| | | | |
|---|---|---|---|
| 5,294,200 A * | 3/1994 | Rall | 374/120 |
| 5,339,687 A | 8/1994 | Gimson | |
| 6,431,010 B1 | 8/2002 | Joffe | |
| 6,826,954 B2 * | 12/2004 | Brown | 73/204.13 |

FOREIGN PATENT DOCUMENTS

| | | |
|---|---|---|
| GB | 1248563 | 10/1971 |
| GB | 2019578 A | 10/1979 |
| GB | 2199954 A | 7/1988 |
| GB | 2286890 A | 8/1995 |
| GB | 2401430 A | 11/2004 |
| WO | WO 2004/042326 A2 | 5/2004 |

* cited by examiner

*Primary Examiner*—Harshad Patel
(74) *Attorney, Agent, or Firm*—Trop, Pruner & Hu, P.C.; Dona C. Edwards; Bryan P. Galloway (57) ABSTRACT

A method of measuring fluid properties such as flow velocity, flow rate, and fluid composition comprises positioning a heat exchange element with a temperature sensor, such as an optical fiber temperature sensor, arranged centrally inside the element in thermal contact with a fluid of interest, heating or cooling the heat exchange element to cause a temperature difference and exchange of thermal energy between the element and the fluid, using the temperature sensor to measure the temperature of the heat exchange element during the exchange of thermal energy, and determining properties of the fluid from the temperature measurement. A second temperature sensor can be provided offset from the first sensor to provide additional measurements to improve accuracy, and a plurality of heat exchange elements with temperature sensors can be used together to determine fluid properties over a large region.

39 Claims, 4 Drawing Sheets

METHOD AND APPARATUS FOR MEASURING FLUID PROPERTIES

BACKGROUND OF THE INVENTION

1. Field of the Invention

The present invention relates to a method and apparatus for measuring properties of fluids, particularly, but not exclusively, fluids within oil wells, the properties including fluid flow and fluid composition.

2. Description of Related Art

A known device for measuring fluid flow is the hot wire anemometer described in L. V. King, "Precision measurement of air velocity by means of the linear not-wire anemometer", Phil. Mag., Series 6, 29, p. 599-604 (1915), the operating principle of which depends on the cooling effect of a fluid flowing past a heated object, so that a measurement of the temperature change of the object gives an indication of the rate of flow of the fluid. A thin wire, typically a few millimeters long, is placed orthogonally to the direction of the flow to be measured. A voltage is applied across the wire, and the resulting current flow through the wire, which is inversely proportional to the resistance according to Ohm's law, heats the wire. This heat is transferred to the fluid at a rate which is dependent on the flow rate of the fluid, until a final equilibrium temperature of the wire is reached. The wire resistance depends on its temperature, so the current can be related to the flow velocity. Measurement of the current can therefore be used to calculate the flow rate.

Flow rate measurement techniques are widely used in the oil industry to determine the rate of flow of oil, gas, and water within oil wells. The hot wire anemometer is disadvantageous in this situation. The device provides a single localized measurement, whereas wellbores can be hundreds or thousands of meters deep, with the fluid flow at all or many depths being of interest. Further, it is preferred not to use electric current in oil industry sensors because of the risk of explosion. Also, the thin wire is fragile, and hence unsuited to the rigors of the downhole environment.

In contrast, optical fibers are known to be well-suited for downhole sensing applications. They are robust enough to withstand the high temperatures and pressures, and operate without electric current. Distributed measurements can be obtained representing the whole length of a fiber, thus providing a more complete picture than individual discrete measurements. In particular, optical fibers have been shown to be of use for downhole temperature sensing. A technique known as distributed temperature sensing detects changes in backscattered light from within the fiber caused by changes in temperature.

Consequently, a number of flow measurement methods have been proposed which exploit the proven technology of optical fiber temperature sensing. A first technique, described in PCT Patent Application WO 00/11317, uses the cooling effect of flowing fluid exploited in the hot wire anemometer. A heater cable is disposed within the production tubing of an oil well, and is heated by current being passed through it. Optical fibers are arranged adjacent to the cable, and operate as temperature sensors to measure the temperature of the heated cable as it is cooled by flowing oil. This gives temperature measurements at spaced locations over the extent of the cable, from which the fluid flow is determined. Thus a pseudo-distributed measurement is possible.

A further technique relies on the transfer of heat from a heat source to the fluid and is described in PCT Patent Application WO 99/45235. A thermal sensor, which may have the form of an optical fiber, is arranged downhole adjacent to a thermal source. The source is heated, and the sensor is used to measure changes in the fluid caused by the transfer of heat to the fluid. The flow rate is calculated from the amount of heat transferred. This two-part arrangement of sensor and source is complex to deploy, operate, and maintain, and the results require the distance between source and sensor to be considered.

A similar arrangement of equipment is used in a more recent approach which, however, is less mathematically complex. As described in PCT Patent Application WO 01/75403, a fiber temperature sensor is deployed in the wellbore together with one or more cooling stations arranged upstream with respect to the direction of oil flow. A quantity of oil is cooled by the cooling station, and the temperature sensor detects the presence of this oil at two or more positions as it flows up the wellbore. From this, the flow velocity is calculated. This is a simple approach, but requires the cooling station to be arranged in the passage of the oil, which then can disturb the flow.

An alternative method, described in PCT Patent Application WO 01/04581, relies in the long term only on a fiber temperature sensor, with no other downhole equipment being required. A model is used to calculate flow from the temperature measurements. The method is mathematically intensive, because many parameters describing the well are required to obtain an accurate model.

In addition to the disadvantages outlined above, the various methods described are intended for the measurement of fluid flow rate only. However, other fluid characteristics and parameters are often of interest. Hence there is a requirement for an improved fluid measurement technique capable of measuring fluid properties including fluid flow.

BRIEF SUMMARY OF THE INVENTION

Accordingly, a first aspect of the present invention is directed to a method of measuring fluid properties comprising: positioning a heat exchange element in thermal contact with a fluid; arranging a temperature sensor substantially centrally inside the heat exchange element, the temperature sensor being operable to measure the temperature of the heat exchange element; altering the temperature of the heat exchange element to effect a temperature difference and consequent exchange of thermal energy between the heat exchange element and the fluid; measuring the temperature of the heat exchange element during the exchange of thermal energy, using the temperature sensor; and determining one or more properties of the fluid from the temperature measurement.

The amount and rate of thermal energy exchange is dependent on the nature of the fluid, so that properties of the fluid can be determined from a measurement of the exchange. Measuring the temperature response of the heat exchange element is a simple and convenient way of obtaining an indication of the energy exchange, and can be performed particularly accurately by using a temperature sensor positioned centrally inside the heat exchange element. In this location, the sensor detects the maximum bulk temperature changes in the heat exchange element so that minor regional fluctuations are avoided. Also, the sensor is isolated from the fluid, and hence from any cooling or heating effect produced thereby on the sensor which could distort the measurements and reduce the magnitude of any detected temperature changes, giving a system with poor resolution.

Various properties of the fluid can be determined from the temperature measurement. For example, a flowing fluid can deliver or carry away more heat energy than a static fluid, so that the energy exchange is related to the flow. Therefore, if the fluid is flowing during the exchange of thermal energy, the one or more properties of the fluid may comprise a flow velocity, and/or a flow rate.

Alternatively or additionally, the one or more properties of the fluid may comprise proportions of constituents of the fluid. The ability of the fluid to deliver or remove heat energy depends also on the fluid type, so that the temperature measurement can be used to determine what fluid is present, or what the constituent parts of the fluid are if it is a mixture. An example of this is in the oil industry, where the water cut can be measured if the constituents comprise oil and water.

The method operates well with either a positive or a negative temperature difference between the heat exchange element and the fluid. The choice may depend on the availability and convenience of techniques for altering the heat exchange element temperature, and on the initial temperature of the fluid. Therefore, in some embodiments, altering the temperature of the heat exchange element comprises heating the heat exchange element, for example by application of electric current to one or more electrical heating coils in the heat exchange element, or by causing an exothermic chemical reaction in the heat exchange element. In alternative embodiments, altering the temperature of the heat exchange element comprises cooling the heat exchange element, for example by cooling the heat exchange element with a cooled gas.

Any type of temperature sensor can be used, according to factors such as the preference of the user, the required sensitivity and resolution of the measurement, and the suitability of different sensor types for various measurement environments. The temperature sensor may comprise an optical fiber temperature sensor, for example. Optical fiber sensors are robust, compact, can be deployed in remote locations, and are free from risks associated with the use of electricity, such as explosion. Various designs of optical fiber temperature sensor are available, so that the optical fiber temperature sensor may comprise a distributed temperature sensing system, or one or more discrete temperature sensing devices (such as fiber Bragg gratings). If an optical fiber sensor is not desirable, the temperature sensor may comprise one or more thermocouples, for example.

The method may further comprise arranging a second temperature sensor offset from said temperature sensor, the second temperature sensor being operable to measure the temperature of the heat exchange element; measuring the temperature of the heat exchange element during the exchange of thermal energy, using the second temperature sensor; and using the temperature measurement from the second temperature sensor when determining the one or more properties of the fluid. The additional information available from the second temperature sensor can be used to improve accuracy, since errors and fluctuations in the measurements made with the first sensor that are not caused by the fluid can be identified and accounted for. The second temperature sensor may be arranged inside the heat exchange element, or outside the heat exchange element. A particularly convenient technique for providing the two sensors is such that they comprise respectively first and second portions of an optical fiber of an optical fiber temperature sensor. Thus, a single temperature sensing system can be used to implement both sensors, allowing both sensors to be interrogated in a single operation. While the two sensors may be discrete sensors coupled to a single optical fiber, an advantageous arrangement is if the optical fiber temperature sensor is a distributed temperature sensing system. Different sections of the measured distributed temperature profile will correspond to the two sensors. In either case, the optical fiber temperature sensor may be a double-ended optical fiber temperature sensor system. This allows the sensors to be interrogated from either end of the system, giving additional information that can be used to enhance accuracy, such as by averaging of the measurements.

In some embodiments, the method further comprises positioning one or more additional heat exchange elements in thermal contact with the fluid, and arranging one or more temperature sensors substantially centrally inside the one or more additional heat exchange elements to be operable to measure the temperature of the one or more additional heat exchange elements, such that the one or more properties of the fluid can be further determined from temperature measurements of the one or more additional heat exchange elements. A detailed picture of fluid properties over a large volume or area can thereby be obtained, for example along the length or across the width of a fluid conduit.

The method is particularly suited for use in the oil industry, where many properties of the oil, gas and water present within various parts of a wellbore are of interest and may require constant monitoring for efficient oil production. Therefore, the fluid may be inside an oil well.

A second aspect of the present invention is directed to apparatus for measuring fluid properties comprising: a heat exchange element for deployment in thermal contact with a fluid, the temperature of the heat exchange element being alterable to effect a temperature difference and consequent exchange of thermal energy between the heat exchange element and a fluid in thermal contact with the heat exchange element; and a temperature sensor positioned substantially centrally within the heat exchange element and operable to measure the temperature of the heat exchange element during the exchange of thermal energy. The apparatus may further comprise a processor operable to receive from the temperature sensor temperature measurements of the heat exchange element obtained during the exchange of thermal energy, and to determine one or more properties of the fluid from the temperature measurements.

The one or more properties of the fluid may comprise one or more of: flow velocity; flow rate; proportions of constituents of the fluid; and proportions of oil and water in the fluid. The temperature of the heat exchange element may be alterable such that the heat exchange element can be heated. To this end, the heat exchange element may include electrical heating coils operable to heat the heat exchange element, or the heat exchange element may include a catalyst operable to effect an exothermic chemical reaction when exposed to a suitable chemical. Alternatively, the temperature of the heat exchange element may be alterable such that the heat exchange element can be cooled. To this end, the heat exchange element may comprise an inlet line containing a pressure release valve by which a cooled gas may be supplied to the heat exchange element. The temperature sensor may comprise an optical fiber temperature sensor, which may comprise a distributed temperature sensing system, or one or more discrete temperature sensing devices. Alternatively, the temperature sensor may comprise one or more thermocouples.

The apparatus may further comprise a second temperature sensor offset from the said temperature sensor, the second temperature sensor being operable to measure the temperature of the heat exchange element during the exchange of thermal energy. The processor may be further operable to receive from the second temperature sensor temperature measurements of the heat exchange element obtained during the exchange of thermal energy, and to use the temperature measurements from the second temperature sensor when determining the one or more properties of the fluid. The second temperature sensor may be arranged inside the heat exchange element, or outside the heat exchange element. The said temperature sensor and the second temperature sensor may comprise respectively first and second portions of an optical fiber of an optical fiber temperature sensor. The optical fiber temperature sensor may be a distributed temperature sensing system. The optical fiber temperature sensor may be a double-ended optical fiber temperature sensing system.

The apparatus may further comprise one or more additional heat exchange elements for deployment in thermal contact with the fluid, the temperature of each heat exchange element being alterable to effect a temperature difference and consequent exchange of thermal energy between that heat exchange element and the fluid; and one or more additional temperature sensors positioned substantially centrally within the one or more additional heat exchange elements and operable to measure the temperature of the one or more additional heat exchange elements during the exchange of thermal energy.

The heat exchange element may be for deployment in thermal contact with a fluid inside an oil well.

BRIEF DESCRIPTION OF THE DRAWINGS

For a better understanding of the invention and to show how the same may be carried into effect, reference is now made by way of example to the accompanying drawings in which.

DETAILED DESCRIPTION OF THE INVENTION

The present invention uses optical fiber or other temperature sensors to measure temperature. It further makes use of the physical principle underlying the hot wire anemometer described above in the introduction, whereby the temperature change of an object in flowing fluid can be used to calculate the rate of flow, because the heat energy transferred between the object and the fluid is proportional to the flow rate. However, this principle is taken further in that the heat energy transfer also depends on other properties of the fluid, such as the fluid type, so that proportions of various constituents in the fluid can be determined. The fluid need not be flowing. According to embodiments of the invention, a heat exchanger is disposed in thermal contact with a fluid of interest, and either heated above or cooled below the temperature of the fluid. This creates a temperature difference so that the fluid exchanges heat with the heat exchanger and the heat exchanger undergoes a change in temperature. The change is measured by a temperature sensor arranged substantially centrally inside the heat exchanger. Properties of the fluid are then determined from the temperature measurement. The central positioning of the temperature sensor within the heat exchanger means that the sensor is exposed to the maximum heating or cooling of the heat exchanger and is also isolated from the fluid which could affect the measurement by heating or cooling the sensor. This gives highly accurate temperature measurements.

The invention may usefully be implemented in the oil industry, to measure the flow velocities and flow rates of fluids including oil, water, and gas within oil wells, and also to measure the so-called water cut, which is the proportion of water to oil. However, the invention is not so limited.

Figure 1:
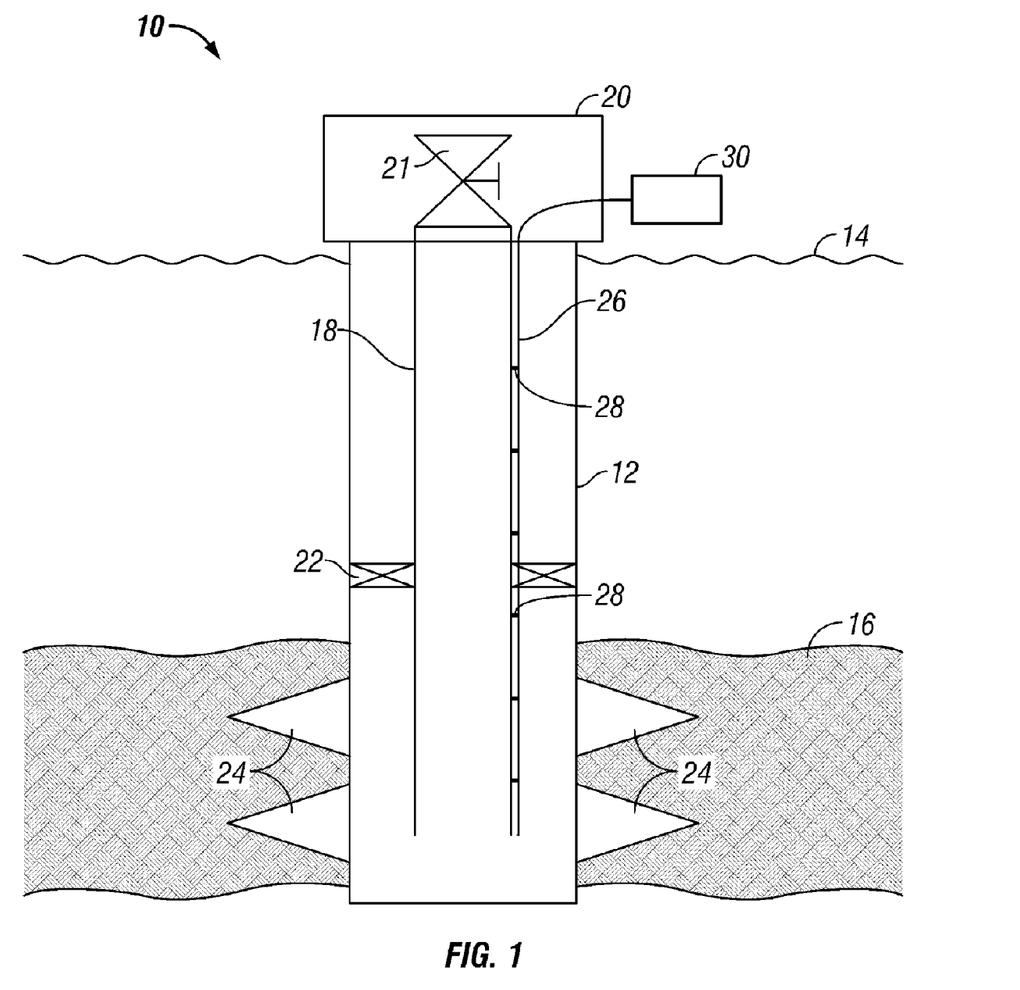
FIG. 1 shows a simplified cross-sectional representation of an oil well including an optical fiber sensor installation that may be used to implement the present invention.

FIG. 1 shows a simplified schematic vertical cross-sectional view of an oil well, illustrating some basic features. The oil well, or wellbore 10 comprises an outer casing 12 sunk into the ground 14, and penetrating through a hydrocarbon reservoir 16, the contents of which are to be extracted using the wellbore 10. Disposed within the casing 12 is a production tubing 18, which is used to carry oil upwards from the reservoir 16 to the surface. The production tubing 18 is open at its lower end, and is held in place within the casing 12 by a packer 22. A wellhead 20 is located over the top end of the casing 12. The system may also include additional equipment used to extract the oil, such as pumping apparatus, valves, and the like. In particular, the system may contain a valve 21 operable to control the flow through the production tubing 18 to regulate the production of oil from the wellbore 10. Oil flows from the reservoir 16 into the casing 12 and then up the production tubing 18 by way of perforations 24 extending through sidewalls of the casing 12 and into the reservoir 16.

Also shown in FIG. 1 is an optical fiber installation. An optical fiber is arranged within a protective control conduit 26. In this example, the control conduit 26 runs down the length of the outer surface of the production tubing 18, and is attached thereto by a number of fasteners 28. A control unit 30 connected to the upper end of the optical fiber installation is provided outside the wellbore 10. The control unit 30 typically contains equipment such as a laser or similar optical source to generate light which propagates along the fiber, and a detector to detect light emitted from the fiber. Fiber deploying apparatus, such as a hydraulic system described in U.S. Pat. No. RE37,283 E, may also be included at the surface to feed the fiber into the control conduit 26, and extract it therefrom. Alternatively, the fiber may be permanently deployed within the conduit 26. Moreover, the conduit 26 and fiber may instead be positioned elsewhere within the wellbore 10, such as on the inner surface of the production tubing 18 or on the inner or outer surface of the casing 12. Furthermore, in some cases, the control conduit 26 may not be necessary, so that the fiber may be deployed in an unhoused arrangement, or provided with an appropriate protective coating.

The fiber can be installed in a single-ended configuration, with one end at the control unit 30 and the other end within the wellbore 10, or in a looped or double-ended configuration in which the fiber extends from the control unit 30 down into the wellbore 10 and back to the control unit 30. This allows double-ended operation, in which light can be launched into and detected from both ends of the fiber.

Optical fibers arranged as described above are commonly used in wellbores as sensors and detectors. Light is launched into the fiber and subsequently detected when emitted from the fiber. The amount of light detected, and its wavelength, phase, and other properties, can be affected by physical conditions within the wellbore, which gives a way of measuring these conditions. For example, temperature affects the quantity of light which is back-scattered up the fiber by Raman scattering, so monitoring of the Stokes and anti-Stokes components in detected back-scattered light gives a measurement of temperature within the wellbore. Alternatively, optical fibers can be used to convey light to and from separate optical sensors situated within the wellbore.

Optical fibers have been well-proven for use in oil wells. They are robust, able to withstand the environmental rigors to which they are exposed when deployed at depth underground, and are also safe for use in a combustible environment.

One particularly advantageous technique that allows a distributed measurement of temperature along the length of the fiber is known as distributed temperature sensing (DTS). To perform DTS, a pulse of light is generated from a light source and launched into one end of an optical fiber. The light propagates along the fiber, interacting with the material of the fiber at all points along the fiber length. This interaction produces a small amount of scattered light from Raman scattering. The Raman scattered light is shifted in wavelength from the original pulse, and has an amplitude that varies with the temperature of the fiber.

Figure 2:
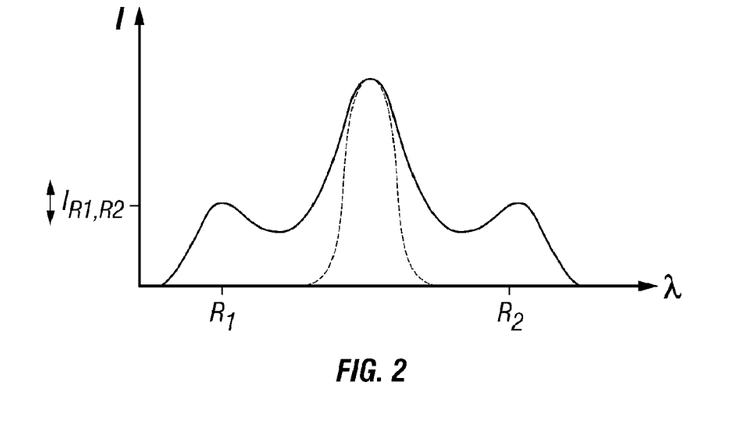
FIG. 2 shows a representative spectrum of light emitted from the optical fiber installation of FIG. 1 when used as a distributed temperature sensing (DTS) system.

FIG. 2 shows an example spectrum of a pulse of light that has undergone Raman scattering, as a plot of wavelength λ against intensity I. The dotted curve represents the original pulse launched into the fiber, and the solid curve represents the pulse after scattering. The pulse is greatly broadened about the original central wavelength, and has two side peaks R1 and R2 arising from the Raman scattering, one on each side of the central peak. These peaks have intensities $I_{R1}$ and $I_{R2}$ that vary with temperature, as indicated by the arrow in the Figure. The short wavelength peak R1 is commonly used for DTS.

Some of the Raman scattered light is back-scattered back along the fiber towards the source, and is detected as it is emitted from the fiber. The speed of light within the fiber is constant, so the amount of time between launch of the pulse and detection of the back-scattered light is proportional to the position along the fiber at which the scattering occurred. Thus, the output of the fiber over time represents a distributed measurement, or profile, over the entire length of the fiber, with time corresponding to distance and amplitude corresponding to temperature.

Alternative DTS arrangements rely on the detection of changes in other optical phenomena and characteristics, such as Brillouin scattering, attenuation arising from microbending and other loss-inducing factors, and interferometric arrangements.

Figure 3:
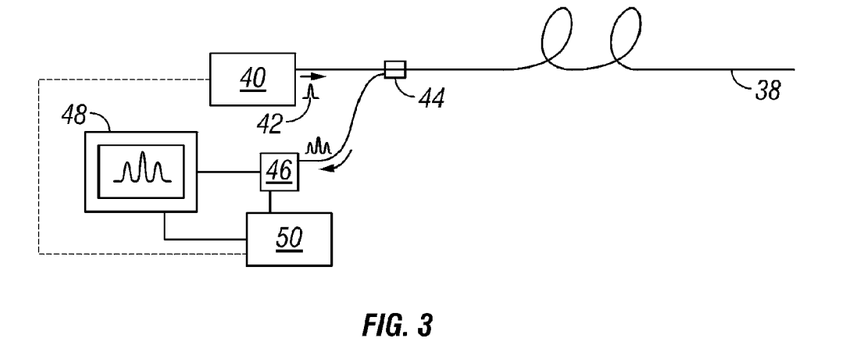
FIG. 3 shows a detailed schematic representation of the optical fiber sensor installation of FIG. 1 arranged as a DTS system.

FIG. 3 is a schematic diagram of apparatus suitable for obtaining a single-ended DTS measurement from an optical fiber 38. An optical source 40 is operable to generate pulses of light 42, which are coupled into a first end of the optical fiber 38. The optical fiber 38 is provided with an optical coupler 44 towards its first end which is arranged to couple back-scattered light arising from Raman scattering out of the optical fiber 38 (and hence away from the optical source 40) and to a photodetector 46. The coupling is straightforward to achieve with known devices such as a fused fiber coupler or a wavelength division multiplexer, because of the difference in wavelength between the original pulse and the Raman scattering. The photodetector 46 generates a signal representing the amplitude of the detected light, which is supplied to a display device 48, which displays the signal for observation by a user if desired. A processor 50, such as a computer or suitable circuitry, is also provided and arranged to receive the photodetector signal and process it as desired, for example by performing calculations to convert time into distance along the fiber, and looking for fluctuations in the amplitude of the detected light. This combination of display device 48 and processor 50 is merely exemplary. Any preferred arrangement of data processing, data storage, data display, and similar apparatus can be utilized as required to obtain output from the optical fiber 38 in a desired form. The processor 50 may further control the optical source 40 (indicated in FIG. 3 by a control line shown in phantom), so that the temperature measurement process can be carried out automatically if the processor 50 is provided with suitable instructions. In the context of the oil well 10 shown in FIG. 1, the control unit 30 comprises the optical source 40, the optical coupler 44, the photodetector 46, the display device 48, and the processor 50.

Optical fiber-based temperature measurements can also be made by using fibers to carry signals to and from discrete optical sensing devices. These may be, for example, fiber Bragg gratings, the optical reflectivities of which vary with temperature so that the wavelength and/or quantity of light reflected relates to the temperature. Individual sensors such as this give discrete measurements, but if several are arranged along the measurement region of interest, pseudo-distributed measurements can be obtained. Similar apparatus to that shown in FIG. 3 can be used to operate one or more discrete sensors. Any fiber-based temperature sensor can be used to implement the present invention. However, the invention is not limited to optical fiber temperature sensors, although such sensors are advantageous if the invention is employed in the oil industry. Any temperature sensor that can be appropriately disposed inside the heat exchange element and which gives a sufficiently accurate measurement of the temperature thereof can be used. For example, a thermocouple can be used.

Figure 4:
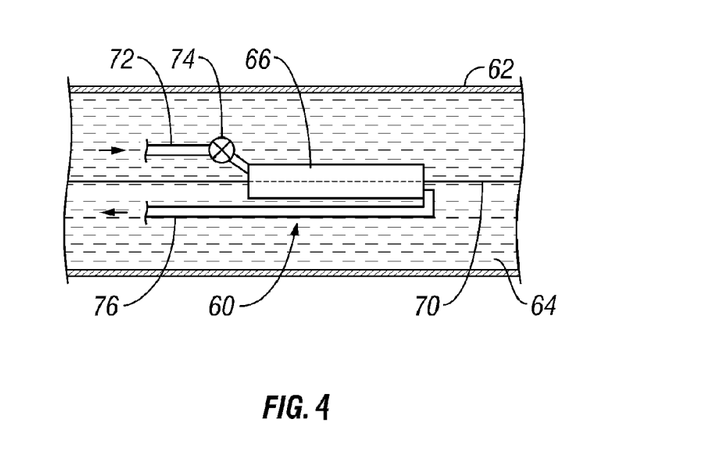
FIG. 4 shows a schematic representation of a first embodiment of apparatus according to the present invention, arranged within a fluid conduit.

FIG. 4 shows a schematic representation of apparatus 60 according to a first embodiment of the present invention. A portion of a fluid conduit 62, such as production tubing of an oil well, is shown in partial cross-section. The conduit 62 contains a fluid of interest 64, which surrounds the apparatus 60. The apparatus comprises a heat exchange element 66, which in this example has a gas inlet line 72 with an inlet valve 74 and a gas exhaust line 76. A temperature sensor in the form of an optical fiber 70 is positioned inside the heat exchange element 66 such that it runs longitudinally along the central axis of the heat exchange element 66. The optical fiber 70 may be disposed directly within the heat exchange element, or it may be housed within a control conduit; this protects the optical fiber 70 and also provides a means for deployment and removal of the optical fiber 70 if desired.

In this example, the heat exchange element 66 is intended to be cooled with respect to the fluid 64 to effect the necessary temperature difference and exchange of thermal energy. This is achieved using gas cooling. A gas with a large Joule-Thomson response, such as nitrogen or carbon dioxide, is carried by the gas inlet line 72 under extremely high pressure from a source located remote from the apparatus (such as above ground if the apparatus is within an oil well). The gas inlet line 72 leads to the heat exchange element 66 via the inlet valve 74, which is a pressure release valve. In this example, the gas inlet line 72 is pressurized below 45 MPa when the inlet valve 74 is shut. As soon as the pressure in the gas inlet line 72 exceeds 45 MPa, the valve 74 opens and allows passage of the high pressure gas therethrough. The pressure drops, and the gas undergoes Joule-Thomson cooling. The cooled gas passes into the heat exchange element 66, which is in thermal contact with the fluid 64. The heat exchange element 66 is therefore initially cooled below the temperature of the fluid 64, but then heat energy is exchanged with the hotter fluid 64, and the temperature of the heat exchange element 66 increases, to be measured by the optical fiber temperature sensor 70. After passing through the heat exchange element, the gas is carried away by the exhaust line 76.

Other arrangements can be used to change the temperature of the heat exchange element. For example, using apparatus similar to that shown in FIG. 4, a chemical, such as an acid, can be pumped from a remote source to the heat exchange element 66 along the inlet line 72. A catalyst within the heat exchange element 66 reacts with the acid by an exothermic reaction, heat energy is given off and the heat exchange element 66 is heated above the temperature of the fluid 64. After the reaction, an exhaust line 76 carries away the reaction end products. Delivery of the acid to the heat exchange element 66 can be controlled by an inlet valve 74 in the inlet line 72. To produce a cooling effect in the heat exchange element 66, a chemical and catalyst combination giving an endothermic reaction can be used.

Figure 5:
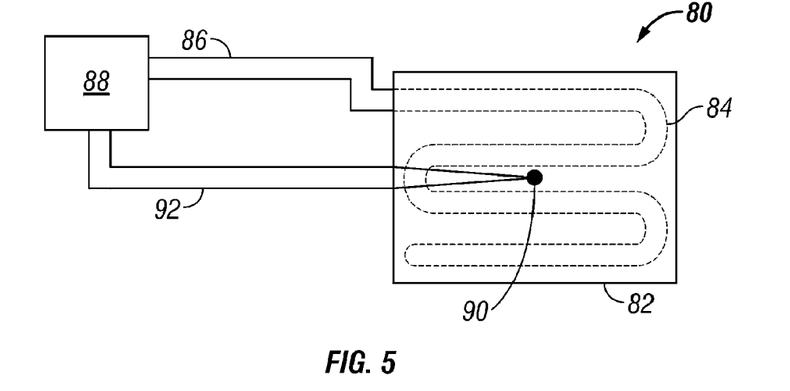
FIG. 5 shows a schematic representation of a second embodiment of apparatus according to the present invention.

Alternatively, electronic or electrical arrangements can be used. FIG. 5 shows a schematic representation of an embodiment of such apparatus. The apparatus 80 comprises a heat exchange element 82 that is heated by electrical heating coils 84 that receive an electric current from a current source in a control unit 88, via leads 86. The control unit 88 may supply current according to a particular heating cycle or at selected times, for example. The temperature sensor comprises a thermocouple 90 positioned centrally within the heat exchange element 82, and connected to the control unit 88 by leads 92, the control unit 88 including a device by which the response of the thermocouple 90 may be read. A single control unit 88 for both heating coils 84 and thermocouple 90 is convenient, but the devices may be operated separately.

Regardless of the heating or cooling method used, operation of the apparatus is substantially the same. The temperature of the heat exchange element is raised or lowered with respect to that of the fluid to give a temperature difference so that thermal transfer occurs between the heat exchange element and the fluid. The fluid therefore exchanges heat energy with the heat exchange element, and the temperature of the heat exchange element is altered by the presence of the fluid. The amount of heat energy exchanged, and hence the amount by and rate at which the temperature of the heat exchange element is changed depends on the thermal properties of the fluid, so that a measurement of the temperature of the heat exchange element can be used to determine properties of the fluid. In particular, for a given fluid that is flowing past the heat exchange element, the transient temperature change of the heat exchange element is proportional to the rate of flow and the velocity of the fluid, since a faster flow can deliver or carry away more heat energy. The changing temperature is measured with the temperature sensor using any of the techniques discussed above, from which the rate of change of temperature can be derived, and the flow rate and/or the flow velocity (the two being related via the cross-section of the conduit in which the fluid is flowing) can be calculated from the rate of temperature change.

The temperature measurement may be made at any time during the exchange of heat energy, and for any amount of time, although it is necessary to take account of the measurement time and duration when determining the fluid properties. A longer measurement will give a more accurate indication of the rate of temperature change or may reveal changes of rate that would not be apparent from a shorter measurement. Measurement can be performed during initial heating/cooling of the heat exchange element, and/or during the time after the heating/cooling mechanism is switched off and the heat exchange element is returning to its previous temperature. Also, the heat exchange element may be maintained at the temperature to which it has been heated or cooled, to enable steady-state measurements to be obtained. The heat exchange element may further be subjected to a heating/cooling cycle with temperature measurements being made during all or part of the cycle.

The calculation of flow rate/velocity may conveniently include a comparison of the measured rate of temperature change with external fluid flow with a measurement obtained with no external flow (in the case of an oil well, achieved by shutting appropriate valves governing oil output at the wellhead, for example). Observation of the percentage reduction or increase in the rate of temperature change from the no-flow condition can give a relative indication of the external flow rate past the heat exchange element. A suitable calibration can be performed to aid calculation. In a vertical well, this can usefully be achieved using rate of temperature change measurements from a heat exchange element situated at the upper end of the wellbore, together with surface fluid flow rates which are typically known for a particular oil well, to derive a relation between flow rate and cooling/heating rate for the well of interest.

In addition to a dependence on fluid flow, the amount of heat energy exchanged between the fluid and the heat exchange element depends on the type of fluid, according to its thermal conductivity and heat capacity. Hence, the temperature measurement can also be used to determine what the fluid is, if the relevant thermal properties of potential fluids are known. This offers a technique for distinguishing between different fluids, for example. More particularly, if the fluid is known to be a mixture of different constituents, the proportion of the constituents can be detected and/or monitored to track any changes in fluid composition. This is of relevance in the oil industry where a parameter known as the water cut is of interest. This is the ratio or proportion of oil and water in fluid extracted from an oil well, and is of importance in indicating potential problems that can cause a change in the composition of extracted oil. Determining the composition of a fluid can be performed on a static fluid, or on a flowing fluid if the thermal exchange caused by the flow is taken into account.

The response of the apparatus depends not only on the thermal properties of the fluid, but also on the temperature resolution of the temperature sensor system, and the thermal output and thermal properties of the heat exchange element. Given that it is the thermal properties of the fluid that are of interest, any combination of temperature sensor system and heat exchanger can be chosen to optimize the response.

The apparatus may further comprise a processor that receives the temperature measurements from the temperature sensor and performs calculations, comparisons, or other analysis to determine the fluid properties. If an optical fiber temperature sensor is used, the determination of the fluid properties from the temperature measurement can be advantageously performed by the processor 50 described with reference to FIG. 3, to give an onsite output. The processor 50 can be provided with the relevant calibration data and any algorithms used to calculate the fluid properties therefrom. Further, via suitable software, hardware, and control lines, the processor 50 may also be operable to control the heating/cooling of the heat exchange element. Further, in an oil well, the processor 50 may also control the oil output valve(s) in the wellhead. This allows a series of measurements at various flow rates to be made automatically, if the processor 50 is provided with suitable programming or other instructions, and also allows automatic regulation of oil production if the processor is configured to open and close the oil output valve(s) in response to flow rate and/or water cut measurements.

The temperature sensor has been described as being positioned substantially centrally inside the heat exchange element. An aim of this is to accurately record the maximum and/or minimum temperatures by removing the effects of any differing thermal conduction parameters that could arise if the temperature sensor is placed on one side of the heat exchange element. In the case of a generally elongate heat exchange element, the central positioning can be achieved by placing the temperature sensor on the central longitudinal axis of the heat exchange element. In heat exchange elements of other shapes, the sensor should be positioned substantially symmetrically within the element so that it is equidistant from the surrounding fluid as far as possible. In all cases, though, it may be necessary to take account of any asymmetry in the heating/cooling mechanism or general structure of the heat exchange element that could give uneven heating or cooling of the heat exchange element, in order that the temperature sensor accurately reflects the true bulk temperature response of the heat exchange element.

For elongate heat exchange elements, the fluid properties can be determined along the length of the element if temperature measurements are made over that length. An optical fiber distributed temperature sensing system having an optical fiber aligned along the longitudinal central axis of the heat exchange element is particularly applicable here, but a number of discrete temperature sensors may be positioned at intervals along the element. Measurements over distance may be useful in cases where a fluid conduit has an incoming or outgoing side branch, for example, where incoming or outgoing fluid flow can change the flow rate and/or the fluid composition. More simply, large extents of a conduit can be monitored with a single system.

According to further embodiments of the invention, a second temperature sensor can be provided. The second sensor is offset from the first sensor, so that it is not centrally positioned with respect to the heat exchange element. The second sensor may be located inside the heat exchange element, or alternatively may be located outside the heat exchange element but in thermal contact with it, for example by being coupled to an outer wall of the heat exchange element by a thermal coupling material. Temperature measurements are then made simultaneously with both temperature sensors, and both temperature measurements can be used in the determination of the fluid properties. If a processor is connected to the apparatus, it can be arranged to receive measurements from the second temperature sensor. The second temperature sensor will measure a different response from the first temperature sensor, because it is subject to different thermal conduction parameters owing to its offset position. This additional information can be used to facilitate more accurate determination of the fluid properties. For example, the second temperature measurement may highlight any fluctuations in the first temperature measurement caused by factors other than the fluid of interest and that should be accounted for.

If optical fiber is used for the temperature sensing, a double-ended fiber system is particularly convenient for implementing the two sensors. The outgoing fiber portion comprises one of the sensors and the return fiber portion comprises the other sensor. This allows further accuracy enhancement since each sensor can be interrogated from both ends of the fiber, yielding yet more temperature information. The double-ended fiber system may be a DTS system. However, any combination of two sensors can be used, such as two discrete temperature sensors, perhaps connected via a single optical fiber, or a single-ended DTS system in which different portions of the sensing fiber are used for the two sensors, or combinations of different types of sensors (one optical and one electrical, for example).

Figure 6A:
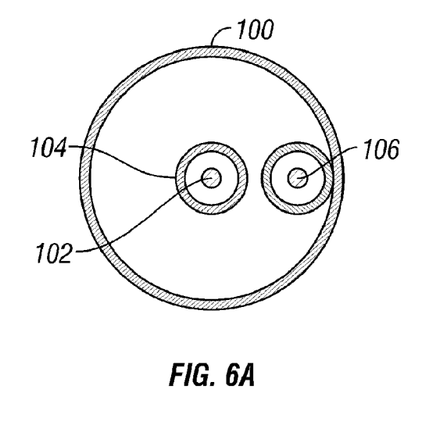
FIGS. 6A and 6B show schematic cross-sectional representations of further embodiments of apparatus according to the present invention.
Figure 6B:
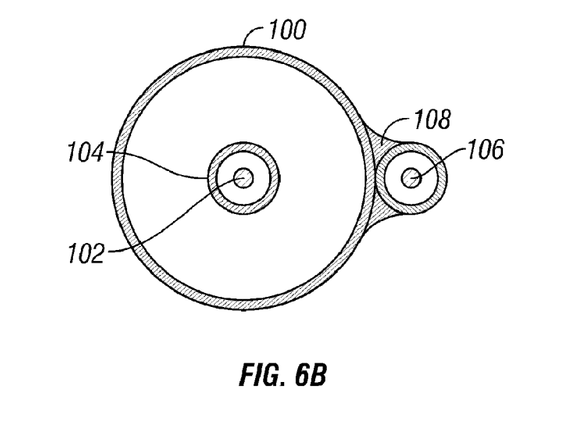

FIGS. 6A and 6B are schematic representations of embodiments of the invention incorporating second temperature sensors. Shown in cross-section, FIG. 6A depicts a heat exchange element 100 with a first optical fiber temperature sensor 102 disposed centrally within it, the fiber being housed inside a control conduit 104. A second optical fiber temperature sensor 106, similarly housed, is positioned inside the heat exchange element 100, but towards one side of the element. FIG. 6B shows the same component parts, but in this example the second temperature sensor 106 is located outside the heat exchange element 100, and thermally coupled to it with suitable heat-transferring material 108.

In some cases it may be desirable to employ more than one heat exchange element, so that measurements can be obtained from a plurality of locations within a fluid volume, such as an oil well. The elements may be arranged spaced apart along a fluid conduit, for example. In a vertical wellbore, this permits a profile of flow rate/velocity and/or water cut with depth of the wellbore to be obtained. If the temperature sensors are deployed via control conduits, a single control conduit can communicate with each of the heat exchange elements, and a single optical fiber can incorporate temperature sensors for all of the heat exchange elements. Alternatively, separate optical fibers can be housed in the same control conduit. In the case of a single optical fiber, the optical fiber may comprise a DTS system so that all the heat exchange elements can be monitored with a single sensor. Alternatively, a discrete temperature sensor (fiber-based or otherwise) can be provided for each element.

Figure 7:
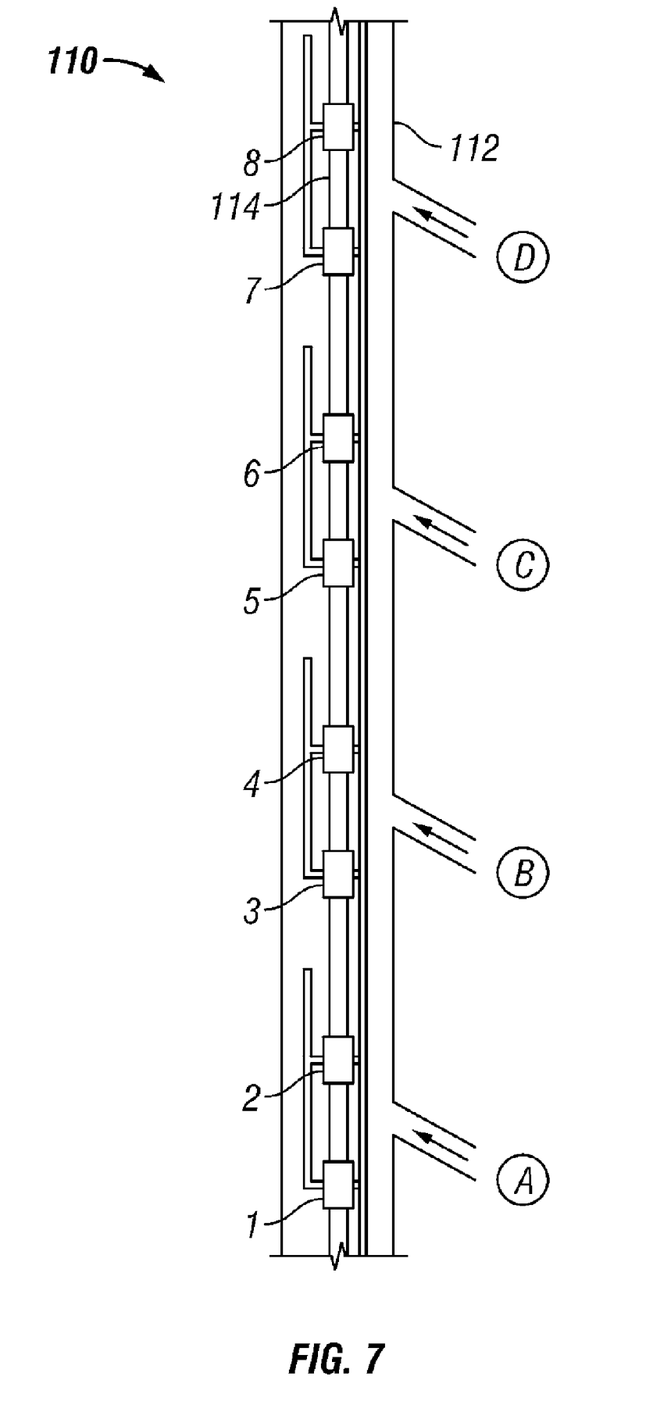
FIG. 7 shows a schematic representation of a yet further embodiment of apparatus according to the present invention, comprising multiple elements arranged longitudinally in a fluid conduit.

FIG. 7 shows a simplified schematic representation of a plurality of heat exchange elements arranged in a wellbore 110. The wellbore 110 comprises a production tubing 112, with a total of eight heat exchange elements, labeled 1 to 8, provided at spaced apart intervals down the tubing. The elements are gas-cooled, and arranged in four pairs, with each pair sharing gas inlet and exhaust lines (the full extent of the lines up to the surface is not shown in the interest of clarity). A control conduit 114 passes centrally through each heat exchange element, and carries a temperature-sensing optical fiber operable as a DTS system. The wellbore 110 penetrates four vertically separated oil bearing rock formations, or reservoirs, A, B, C and D, each of which contributes to the oil production of the wellbore 110. The plurality of elements allows a fluid property profile of the wellbore to be obtained so that the contribution of each reservoir to the total production output can be determined.

Additionally or alternatively, a number of heat exchange elements and associated temperature sensors can be arranged radially around a fluid conduit. This allows a cross-sectional profile of fluid properties across the conduit to be obtained, for example to monitor whether fluid flow or fluid composition is uniform. Each element has its own associated temperature sensor as before, although the sensors may be linked together and operated as a single system. For example, if optical sensors are used, a single optical fiber may be used to communicate with all the sensors. The single optical fiber may be a DTS fiber, arranged to pass through each heat exchange element in turn. The thermal response of each element is then obtained by looking at the appropriate section of the DTS profile.

Figure 8:
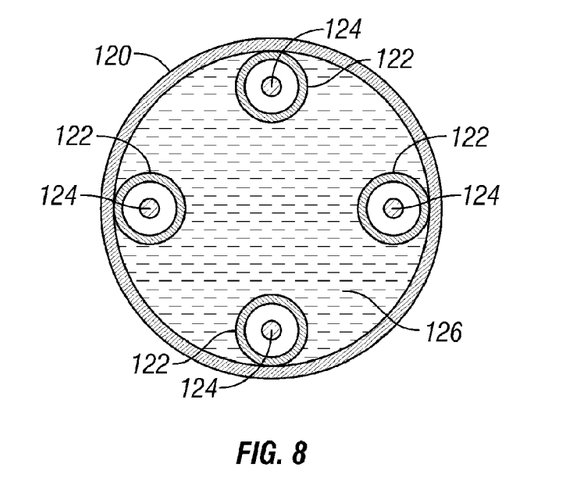
FIG. 8 shows a schematic representation of a still further embodiment of apparatus according to the present invention, comprising multiple elements arranged radially in a fluid conduit.

FIG. 8 shows a schematic cross-section through a fluid conduit 120, in which four heat exchange elements 122 are arranged, positioned radially and equidistantly spaced around the inner perimeter of the conduit 120. The conduit 120 contains a fluid 126, the properties of which are to be determined. Each element 122 has a corresponding centrally positioned temperature sensor 124.

Although the invention has been described with particular reference to the measurement of fluids in the oil industry, it is not limited thereto, and can be used for any fluid measurement application, such as the monitoring of water or gas supply pipelines. However, with regard to the oil industry, the invention is well-suited for use in horizontal wells, where flow-dependent temperature effects are negligible (and hence do not perturb the measurements); multilateral wells, where the apparatus can be installed between the laterals; intelligent wells, where the apparatus can be installed between control valves for both velocity and water cut measurement; and conventional vertical wells for water cut measurement where velocity measurement can be derived from analysis of a conventional DTS temperature profile.

What is claimed is:

1. A method of measuring fluid properties comprising:
   positioning a heat exchange element in thermal contact with a fluid;
   arranging a temperature sensor inside the heat exchange element, the temperature sensor comprising an optical fibre temperature sensor and being operable to measure the temperature of the heat exchange element;
   altering the temperature of the heat exchange element by heating the heat exchange element by application of electric current to one or more electrical heating coils in the heat exchange element to effect a temperature difference and consequent exchange of thermal energy between the heat exchange element and the fluid;
   measuring the temperature of the heat exchange element during the exchange of thermal energy, using the temperature sensor; and
   determining one or more properties of the fluid from the temperature measurement.

2. A method according to claim 1, wherein the temperature sensor is arranged substantially centrally inside the heat exchange element.

3. A method according to claim 1, in which the fluid is flowing during the exchange of thermal energy, and the one or more properties of the fluid comprises a flow velocity.

4. A method according to claim 1, in which the fluid is flowing during the exchange of thermal energy, and the one or more properties of the fluid comprises a flow rate.

5. A method according to claim 1, in which the one or more properties of the fluid comprises proportions of constituents of the fluid.

6. A method according to claim 5, in which the constituents comprise oil and water.

7. A method according to claim 1, in which the optical fibre temperature sensor comprises a distributed temperature sensing system.

8. A method according to claim 1, in which the optical fibre temperature sensor comprises one or more discrete temperature sensing devices.

9. A method according to claim 1, in which the temperature sensor comprises one or more thermocouples.

10. A method according to claim 1, and further comprising arranging a second temperature sensor offset from said temperature sensor, the second temperature sensor being operable to measure the temperature of the heat exchange element;
    measuring the temperature of the heat exchange element during the exchange of thermal energy, using the second temperature sensor; and
    using the temperature measurement from the second temperature sensor when determining the one or more properties of the fluid.

11. A method according to claim 10, in which the second temperature sensor is arranged inside the heat exchange element.

12. A method according to claim 10, in which the second temperature sensor is arranged outside the heat exchange element.

13. A method according to claim 10, in which the said temperature sensor and the second temperature sensor comprise respectively first and second portions of an optical fibre of an optical fibre temperature sensor.

14. A method according to claim 13, in which the optical fibre temperature sensor is a distributed temperature sensing system.

15. A method according to claim 14, in which the optical fibre temperature sensor is a double-ended optical fibre temperature sensing system.

16. A method according to claim 1, and further comprising positioning one or more additional heat exchange elements in thermal contact with the fluid, and arranging one or more temperature sensors substantially centrally inside the one or more additional heat exchange elements to be operable to measure the temperature of the one or more additional heat exchange elements, such that the one or more properties of the fluid can be further determined from temperature measurements of the one or more additional heat exchange elements.

17. A method according to claim 1, in which the fluid is inside an oil well.

18. A method of measuring fluid properties, comprising:
    positioning a heat exchange element in thermal contact with a fluid;
    arranging a temperature sensor inside the heat exchange element, the temperature sensor comprising an optical fibre temperature sensor and being operable to measure the temperature of the heat exchange element;
    altering the temperature of the heat exchange element by heating the heat exchange element by causing an exothermic chemical reaction in the heat exchange element to effect a temperature difference and consequent exchange of thermal energy between the heat exchange element and the fluid;
    measuring the temperature of the heat exchange element during the exchange of thermal energy, using the temperature sensor; and determining one or more properties of the fluid from the temperature measurement.

19. A method of measuring fluid properties, comprising:
positioning a heat exchange element in thermal contact with a fluid;
arranging a temperature sensor inside the heat exchange element, the temperature sensor comprising an optical fibre temperature sensor and being operable to measure the temperature of the heat exchange element;
altering the temperature of the heat exchange element by cooling the heat exchange element to effect a temperature difference and consequent exchange of thermal energy between the heat exchange element and the fluid;
measuring the temperature of the heat exchange element during the exchange of thermal energy, using the temperature sensor; and
determining one or more properties of the fluid from the temperature measurement.

20. A method according to claim 19, comprising cooling the heat exchange element with a cooled gas.

21. Apparatus for measuring fluid properties comprising:
a heat exchange element for deployment in thermal contact with a fluid, the heat exchange element including electrical heating coils operable to heat the heat exchange element to effect a temperature difference and consequent exchange of thermal energy between the heat exchange element and a fluid in thermal contact with the heat exchange element; and
a temperature sensor comprising an optical fibre temperature sensor positioned within the heat exchange element and operable to measure the temperature of the heat exchange element during the exchange of thermal energy.

22. Apparatus according to claim 21, wherein the temperature sensor is positioned substantially centrally within the heat exchange element.

23. Apparatus according to claim 21, further comprising a processor operable to receive from the temperature sensor temperature measurements of the heat exchange element obtained during the exchange of thermal energy, and to determine one or more properties of the fluid from the temperature measurements.

24. Apparatus according to claim 23, in which the one or more properties of the fluid comprise one or more of: flow velocity; flow rate; proportions of constituents of the fluid; and proportions of oil and water in the fluid.

25. Apparatus according to claim 23, and further comprising a second temperature sensor offset from the said temperature sensor, the second temperature sensor being operable to measure the temperature of the heat exchange element during the exchange of thermal energy.

26. Apparatus according to claim 25, in which the processor is further operable to receive from the second temperature sensor temperature measurements of the heat exchange element obtained during the exchange of thermal energy, and to use the temperature measurements from the second temperature sensor when determining the one or more properties of the fluid.

27. Apparatus according to claim 25, in which the second temperature sensor is arranged inside the heat exchange element.

28. Apparatus according to claim 25, in which the second temperature sensor is arranged outside the heat exchange element.

29. Apparatus according to claim 25, in which the said temperature sensor and the second temperature sensor comprise respectively first and second portions of an optical fibre of an optical fibre temperature sensor.

30. Apparatus according to claim 29, in which the optical fibre temperature sensor is a distributed temperature sensing system.

31. Apparatus according to claim 29, in which the optical fibre temperature sensor is a double-ended optical fibre temperature sensing system.

32. Apparatus according to claim 21, in which the optical fibre temperature sensor comprises a distributed temperature sensing system.

33. Apparatus according to claim 21, in which the optical fibre temperature sensor comprises one or more discrete temperature sensing devices.

34. Apparatus according to claim 21, in which the temperature sensor comprises one or more thermocouples.

35. Apparatus according to claim 21, and further comprising one or more additional heat exchange elements for deployment in thermal contact with the fluid, the temperature of each heat exchange element being alterable to effect a temperature difference and consequent exchange of thermal energy between that heat exchange element and the fluid; and one or more additional temperature sensors positioned substantially centrally within the one or more additional heat exchange elements and operable to measure the temperature of the one or more additional heat exchange elements during the exchange of thermal energy.

36. Apparatus according to claim 21, in which the heat exchange element is for deployment in thermal contact with a fluid inside an oil well.

37. Apparatus for measuring fluid properties comprising:
a heat exchange element for deployment in thermal contact with a fluid, the heat exchange element including a catalyst operable to effect an exothermic chemical reaction when exposed to a suitable chemical to thereby heat the heat exchange element to effect a temperature difference and consequent exchange of thermal energy between the heat exchange element and a fluid in thermal contact with the heat exchange element; and
a temperature sensor comprising an optical fibre temperature sensor positioned within the heat exchange element and operable to measure the temperature of the heat exchange element during the exchange of thermal energy.

38. Apparatus for measuring fluid properties comprising:
a heat exchange element for deployment in thermal contact with a fluid, in which the temperature of the heat exchange element is alterable such that the heat exchange element can be cooled to effect a temperature difference and consequent exchange of thermal energy between the heat exchange element and a fluid in thermal contact with the heat exchange element; and
a temperature sensor comprising an optical fibre temperature sensor positioned within the heat exchange element and operable to measure the temperature of the heat exchange element during the exchange of thermal energy.

39. Apparatus according to claim 38, in which the heat exchange element comprises an inlet line containing a pressure release valve by which a cooled gas may be supplied to the heat exchange element.

* * * * *